US007165589B2

(12) United States Patent
Nakamura (10) Patent No.: US 7,165,589 B2
(45) Date of Patent: Jan. 23, 2007

(54) PNEUMATIC TIRE WITH SPIRAL BELT INCLUDING BOTH STEEL CORDS AND FIBER REINFORCING CORDS

(75) Inventor: Tsutomu Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 32 days.

(21) Appl. No.: 10/736,575

(22) Filed: Dec. 17, 2003

(65) Prior Publication Data
US 2004/0123930 A1    Jul. 1, 2004

Related U.S. Application Data

(62) Division of application No. 09/934,580, filed on Aug. 23, 2001, now abandoned.

(30) Foreign Application Priority Data
Aug. 23, 2000   (JP)   ............................. 2000-251962

(51) Int. Cl.
*B60C 9/22*     (2006.01)
*B60C 9/20*     (2006.01)
(52) U.S. Cl. ..................... 152/531; 152/533; 152/536

(58) Field of Classification Search ................ 152/531, 152/533, 536
See application file for complete search history.

(56) References Cited

U.S. PATENT DOCUMENTS

| 5,213,642 | A | * | 5/1993 | Sponagel ................. 152/533 X |
| 5,351,735 | A | * | 10/1994 | Okuda ..................... 152/531 X |
| 5,400,847 | A | * | 3/1995 | Suzuki et al. ................ 152/531 |
| 5,404,924 | A |   | 4/1995 | Yuze |
| 5,441,093 | A |   | 8/1995 | Shirasyouji et al. |
| 5,746,853 | A | * | 5/1998 | Burlacot ..................... 152/531 |
| 5,795,418 | A |   | 8/1998 | Suzuki |

FOREIGN PATENT DOCUMENTS

JP          64-84306          9/1987

* cited by examiner

*Primary Examiner*—Adrienne C. Johnstone
(74) *Attorney, Agent, or Firm*—Sughrue Mion, PLLC (57) ABSTRACT

A pneumatic tire comprises a spiral belt formed by spirally winding a cord(s) along a circumferential direction of a torus tread, wherein the spiral belt is comprised of at least one layer constructed with a combination of two different cords each having an initial tension of not less than 50 cN/cord.

1 Claim, 7 Drawing Sheets

PNEUMATIC TIRE WITH SPIRAL BELT INCLUDING BOTH STEEL CORDS AND FIBER REINFORCING CORDS

CROSS REFERENCE TO RELATED APPLICATION(S)

This is a divisional of application Ser. No. 09/934,580, filed Aug. 23, 2001, now abandoned; the disclosure of which is incorporated herein by reference.

BACKGROUND OF THE INVENTION

1. Field of the Invention

This invention relates to a pneumatic tire having an improved steering stability and a method of producing such a pneumatic tire, and more particularly to a front tire and a rear tire for a motorcycle and a method of producing the same.

2. Description of Related Art

In the conventional front and rear tires as a tire for a motorcycle or the like, a spiral belt formed by spirally winding a cord(s) on an outer circumference of a carcass is recently used as a belt structure. In this case, the belt is constructed by one kind of the cord. In general, there are known a spiral belt comprised of only a steel cord, a spiral belt comprised of only a reinforcing fiber cord made of a resin material or the like.

In the spiral belt comprised of only the steel cord, the rigidity becomes too high and hence it is difficult to highly maintain the ride comfort and the slip resistance. For this end, it is attempted to reduce an end count as the winding number of the steel cord for providing an appropriate rigidity.

When the end count is merely reduced in the spiral belt comprised of only the steel cord, however, there are caused troubles such as lowering of breaking strength to air pressure, lowering of puncture resistance, lowering of fatigue resistances of the tread rubber and the carcass ply against repetitive bending due to the lowering of bending rigidity in a section direction In the spiral belt comprised of only the reinforcing fiber cord, the rigidity is lacking and an amplitude of shimmy behavior becomes easily large and hence it is difficult to maintain the high-speed stability at a higher level during the high-speed running and hold the light feeling and responsibility of the handling and maintain the gripping force at a higher level during the cornering and as a result, it is feared that the steering stability can not sufficiently be ensured.

In the spiral belt comprised of only the fiber reinforcing cord, it is attempted to increase the end count by laminating the cord or to add the other member in order to prevent the lowering of the steering stability. However, when the end count is increased more than necessary or the other members are added, it is difficult to reduce the tire weight and also the gripping force lowers due to the lowering of shearing rigidity accompanied with the lamination.

SUMMARY OF THE INVENTION

Under the above circumstance, the invention is to provide a pneumatic tire capable of improving the steering stability and other performances by using a combination of two different cords to render the end count into an appropriate value and a method of producing such a pneumatic tire.

According to a first aspect of the invention, there is the provision of in a pneumatic tire comprising a spiral belt formed by spirally winding a cord(s) along a circumferential direction of a torus tread, the improvement wherein the spiral belt is comprised of at least one layer constructed with a combination of two different cords consisting of a steel cord and a fiber reinforcing cord each having an initial tension of not less than 50 cN/cord.

In the pneumatic tire according to the invention, the properties of the steel cord having a high compression rigidity and the properties of the fiber reinforcing cord having a low compression rigidity but a high tensile strength can effectively be utilized as a combination of such two different cords in the spiral belt, so that the guarantees of torsional rigidity in the tread, bending rigidity in a section direction, hoop strength as a belt and reinforcement effect can be attained well-balancedly.

Furthermore, it can easily be attained to not only improve the resistance to handling shimmy, high-speed stability (minimization of amplitude of wobbling and convergence of external disorder), light feeling and cornering power in the handling, gripping limit in the cornering and slippage controllability but also maintain the safety and puncture resistance under an inflation of an air pressure at a higher level.

When the spiral belt is constructed with the combination of the two different cords as mentioned above, the end count can be made to an appropriate value while providing an appropriate rigidity, whereby it is possible to improve the steering stability and other performances.

In a preferable embodiment of the first aspect, the fiber reinforcing cord is made from a resin material or an inorganic material. That is, it is sufficient to select the material of the fiber reinforcing cord having an initial tension of not less than 50 cN/cord from the above materials. As the resin material, mention may be made of aromatic polyamide (e.g. aramidnylon, KEVLAR), polyethylene naphthalate (PEN), polyethylene terephthalate (PET), rayon, aliphatic polyamide (e.g. nylon) and the like, while glass, carbon and the like may be mentioned as the inorganic material.

In another preferable embodiment of the first aspect, the two different cords are continuously arranged from an end of the tread to the other end thereof in a widthwise direction. In this case, the rigidity of the tread is more uniformized to more improve the performances such as durability, steering stability and the like.

In the other preferable embodiment of the first aspect, one cord among the two different cords is arranged on both side portions of the spiral belt in the widthwise direction. In this case, the rigidity distribution of the tread can be optionally adjusted, so that it is possible to selectively arrange the two different cords on only a portion having a weak rigidity.

In a still further preferable embodiment of the first aspect, one cord among the two different cords is arranged on a central portion of the spiral belt in the widthwise direction. In this case, the rigidity distribution of the tread can be optionally adjusted likewise the above case.

According to a second aspect of the invention, there is the provision of a method of producing a pneumatic tire comprising a spiral belt formed by spirally winding a cord(s) along a circumferential direction of a torus tread, which comprises arranging a double-start type head in a cord winding machine, and simultaneously winding one to five steel cords and one to five fiber reinforcing cords from one end of the tread toward the other end thereof in a widthwise direction through the cord winding machine.

In the second aspect of the invention, two different cords each having an optimum number of 1–5 can be simultaneously wound by adopting the double-start type head in the cord winding machine, in which the steel cord and the fiber-reinforcing cord are arranged from one end of the tread toward the other end thereof in the widthwise direction at once so as to always sandwich these different cords from each other and alternately position at equal intervals. As a result, the productivity of the tire is improved, and also the rigidity of the tread is made uniform by equally arranging the two different cords to improve the tire performances such as durability, steering stability and the like.

BRIEF DESCRIPTION OF THE DRAWINGS

The invention will be described with reference to the accompanying drawings, wherein.

DETAILED DESCRIPTION OF THE INVENTION

Figure 1:
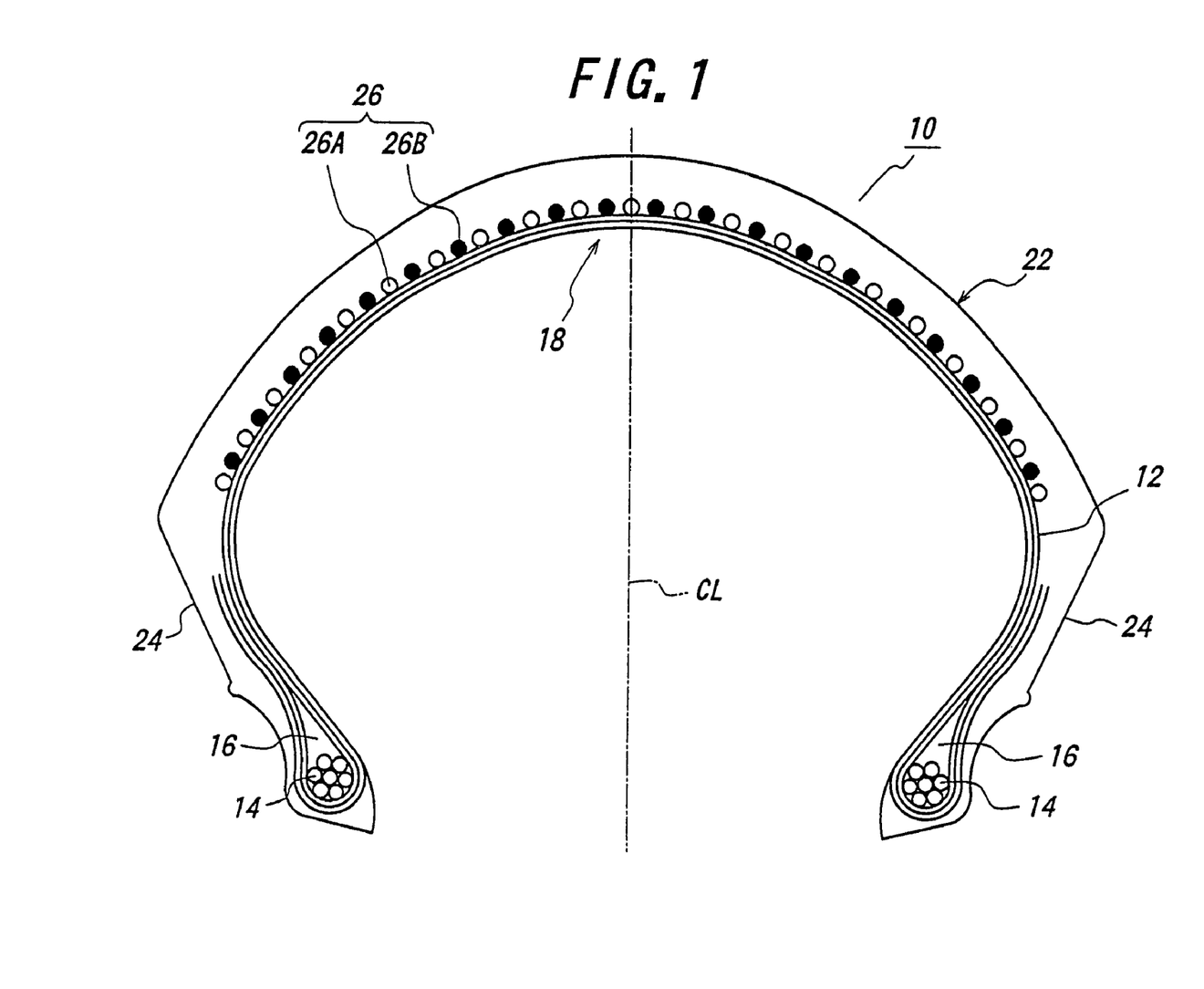
FIG. 1 is a diagrammatically section view of a first embodiment of the pneumatic tire according to the invention.

In FIG. 1 is shown a motorcycle tire 10 as an embodiment of the pneumatic tire according to the invention. A skeleton of the tire 10 is constructed with a carcass 12. The carcass 12 is comprised of plural plies, two plies in the illustrated embodiment each containing polyester cords or the like arranged at a cord angle of 20–90° with respect to an equatorial plane CL of the tire 10.

The carcass 10 extends between a pair of bead cores 14 each formed by bundling ring-shaped steel wires and each end portion thereof is wound around the bead core 14 from an inside of the tire toward an outside thereof in a radial direction to form a turnup portion. Further, a bead filler 16 made of a hard rubber and having a taper shape is arranged above the bead core 14 between the main body and the turnup portion of the carcass 12.

A torus tread 22 made of rubber is arranged on a crown portion 18 of the carcass 12 as an outer member contacting with ground and provided with a tread pattern of land portions defined by grooves. And also, the turnup portion of the carcass 12 is located in a sidewall portion 24 of the tire 10 existing between the bead core 14 and the crown portion 18. Furthermore, an innerliner (not shown) is arranged as an innermost layer of the tire 10.

As shown in FIG. 1, a spiral belt 26 formed by spirally winding a cord along a circumferential direction of the tread 22 is arranged on an outer peripheral side of the crown portion 18 of the carcass 12.

In the invention, the spiral belt 26 is constructed with a combination of two different cords consisting of a steel cord 26A and a fiber reinforcing cord 26B each having an initial tension of not less than 50 cN/cord. As shown in FIG. 1, the two different cords 26A, 26B are arranged in the read 22 from one end of the tread 22 toward the other end thereof so as to sandwich them from each other and alternately and continuously position at equal intervals.

Moreover, the material constituting the fiber reinforcing cord 26B can be selected from aromatic polyamide (KEVLAR), PEN, PET, glass, rayon, aliphatic polyamide and the like.

In the front and rear tires for the motorcycle, the spiral belt formed by spirally winding one kind of the cord is known, but there is no spiral belt formed by simultaneously and spirally winding the two different cords. On the contrary, the spiral belt 26 according to the invention arranged in the circumferential direction of the torus tread 22 is constructed with the combination of the two different cords consisting of the steel cord 26A and the fiber reinforcing cord 26B each having an initial tension of not less than 50 cN/cord.

Furthermore, the two different cords 26A, 26B are continuously arranged from one end of the tread 22 toward the other end thereof in the widthwise direction to form one belt layer as the spiral belt 26 of the tire 10.

In the pneumatic tire 10, therefore, the properties of the steel cord 26A having high compression rigidity and tensile strength and the properties of the fiber reinforcing cord 26B having a low compression rigidity and a high tensile strength can effectively be utilized in combination and hence the guarantees of torsional rigidity in the tread 22, bending rigidity in a section direction thereof, hoop strength as a belt and reinforcement effect can be attained well-balancedly.

Furthermore, it can easily be attained to not only improve the resistance to handling shimmy, high-speed stability (minimization of amplitude of wobbling and convergence of external disorder), light feeling and cornering power in the handling, gripping limit in the cornering and slippage controllability but also maintain the safety and puncture resistance under an inflation of an air pressure at a higher level.

When the spiral belt 26 is constructed with the combination of the two different cords consisting of the steel cord 26A and the fiber reinforcing cord 26B as mentioned above, the end count can be made to an appropriate value while providing an appropriate rigidity, whereby it is possible to improve the steering stability and other performances.

Since the two different cords 26A, 26B are continuously arranged from one end of the tread 22 toward the other end thereof, the rigidity of the tread 22 is made more uniform to more improve the tire performances such as durability, steering stability and the like.

Figure 2:
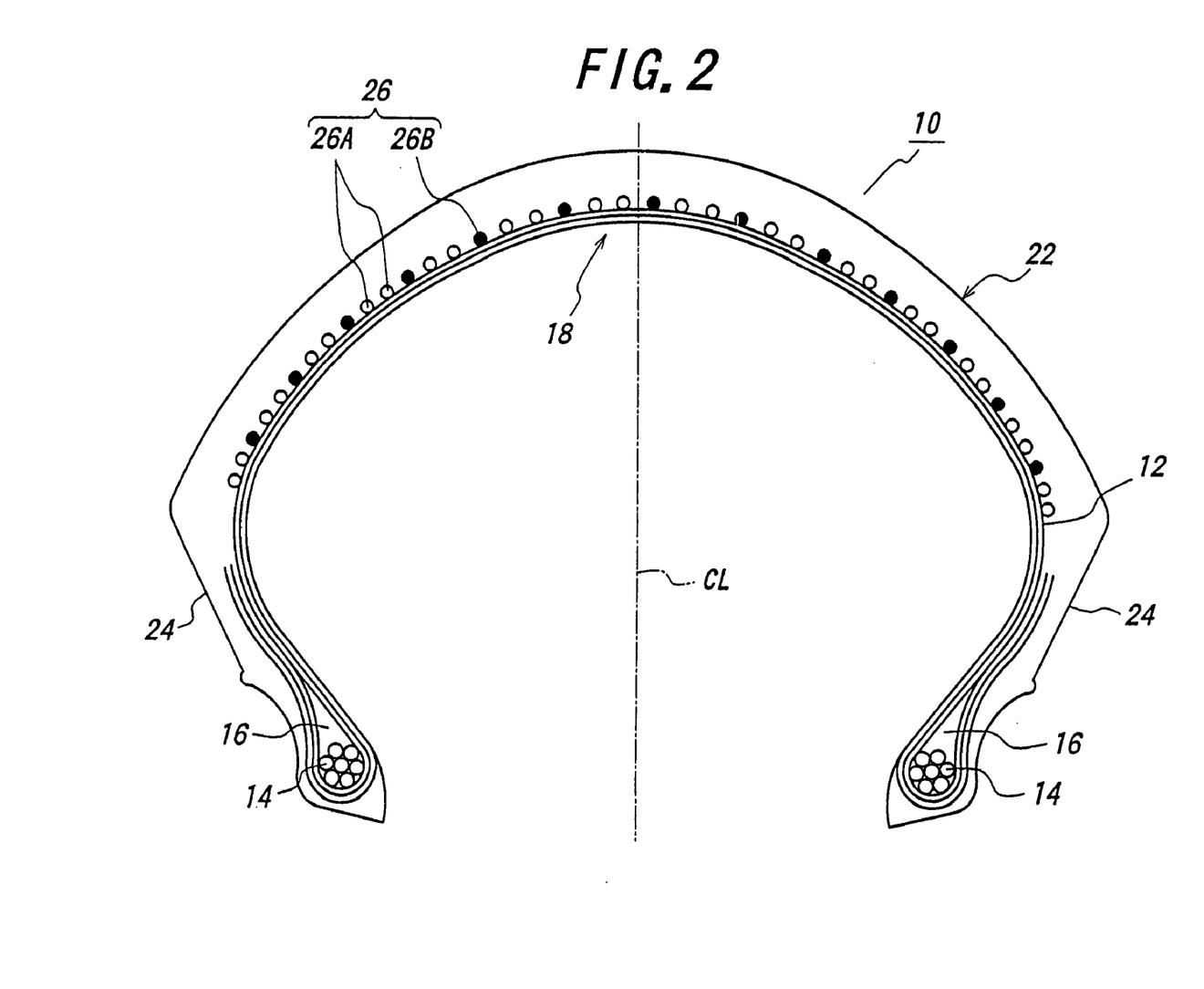
FIG. 2 is a diagrammatically section view of a second embodiment of the pneumatic tire according to the invention.
Figure 3:
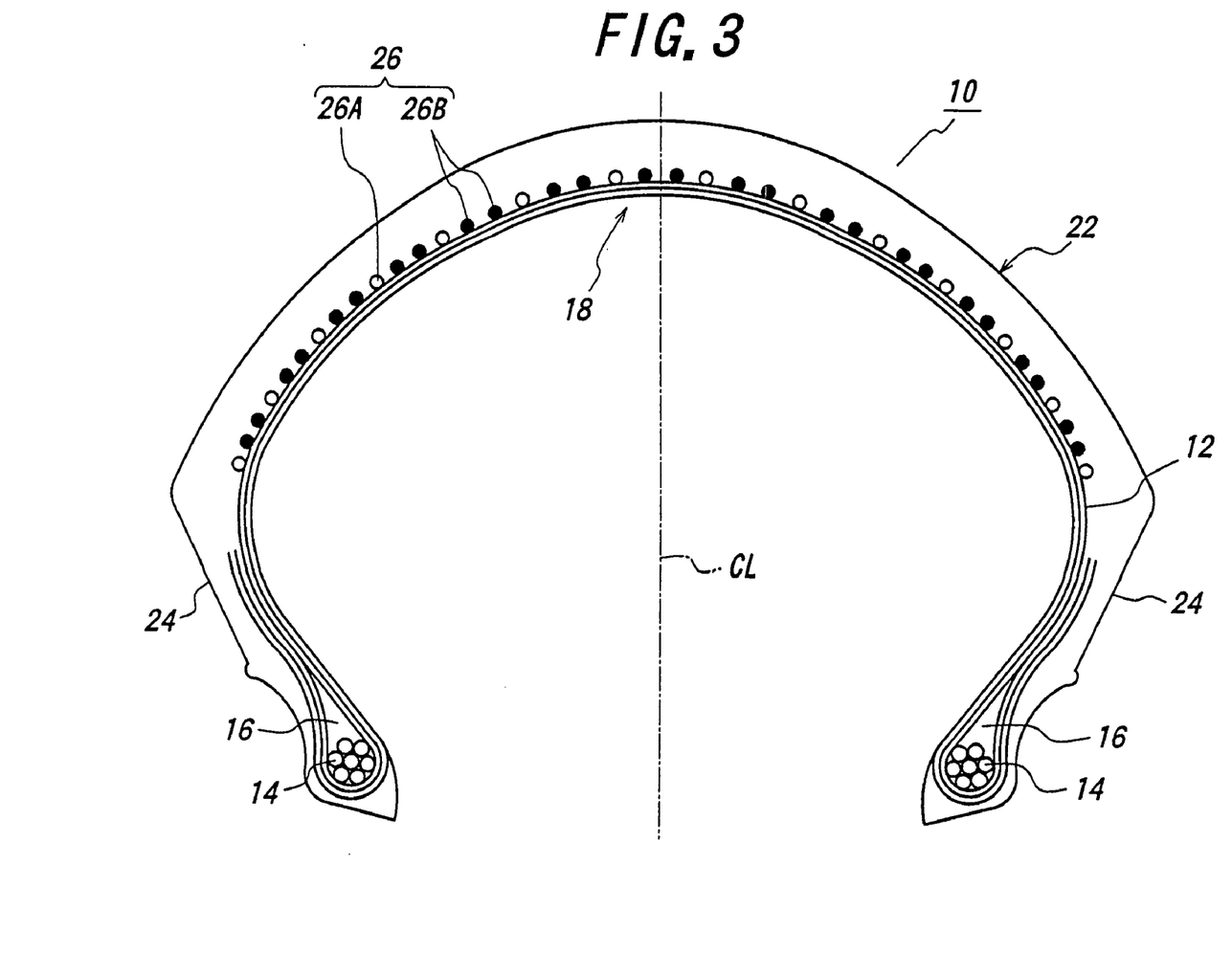
FIG. 3 is a diagrammatically section view of a third embodiment of the pneumatic tire according to the invention.

In the illustrated embodiment, the two different cords consisting of the steel cord 26A and the fiber reinforcing cord 26B are alternately arranged every the cord as shown in FIG. 1. However, as shown in FIG. 2, two steel cords 26A and one fiber reinforcing cord 26B may be alternately arranged, while as shown in FIG. 3, one steel cord 26A and two fiber reinforcing cords 26B may be alternately arranged.

Figure 4:
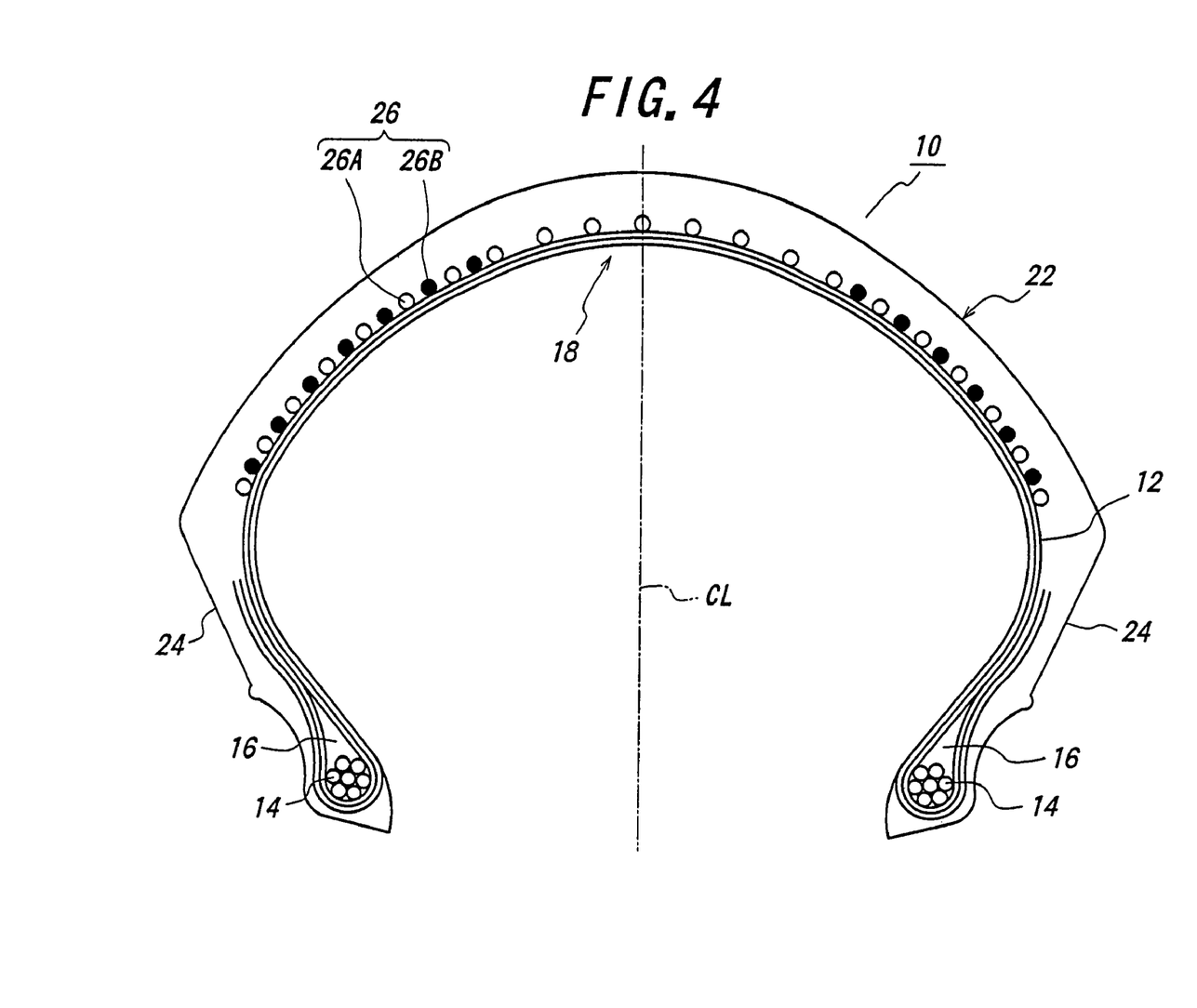
FIG. 4 is a diagrammatically section view of a fourth embodiment of the pneumatic tire according to the invention.

In FIG. 4 is shown a fourth embodiment of the pneumatic tire according to the invention, wherein one cord, for example, the fiber reinforcing cord 26B among the two different cords 26A, 26B is arranged on both side portions of the spiral belt 26 in the widthwise direction of the tire 10 instead of the arrangement of the two different cords shown in FIG. 1. In this case, the rigidity distribution of the tread 22 can be optionally adjusted, so that it is possible to selectively arrange the two different cords on only a portion having a weak rigidity.

Figure 5:
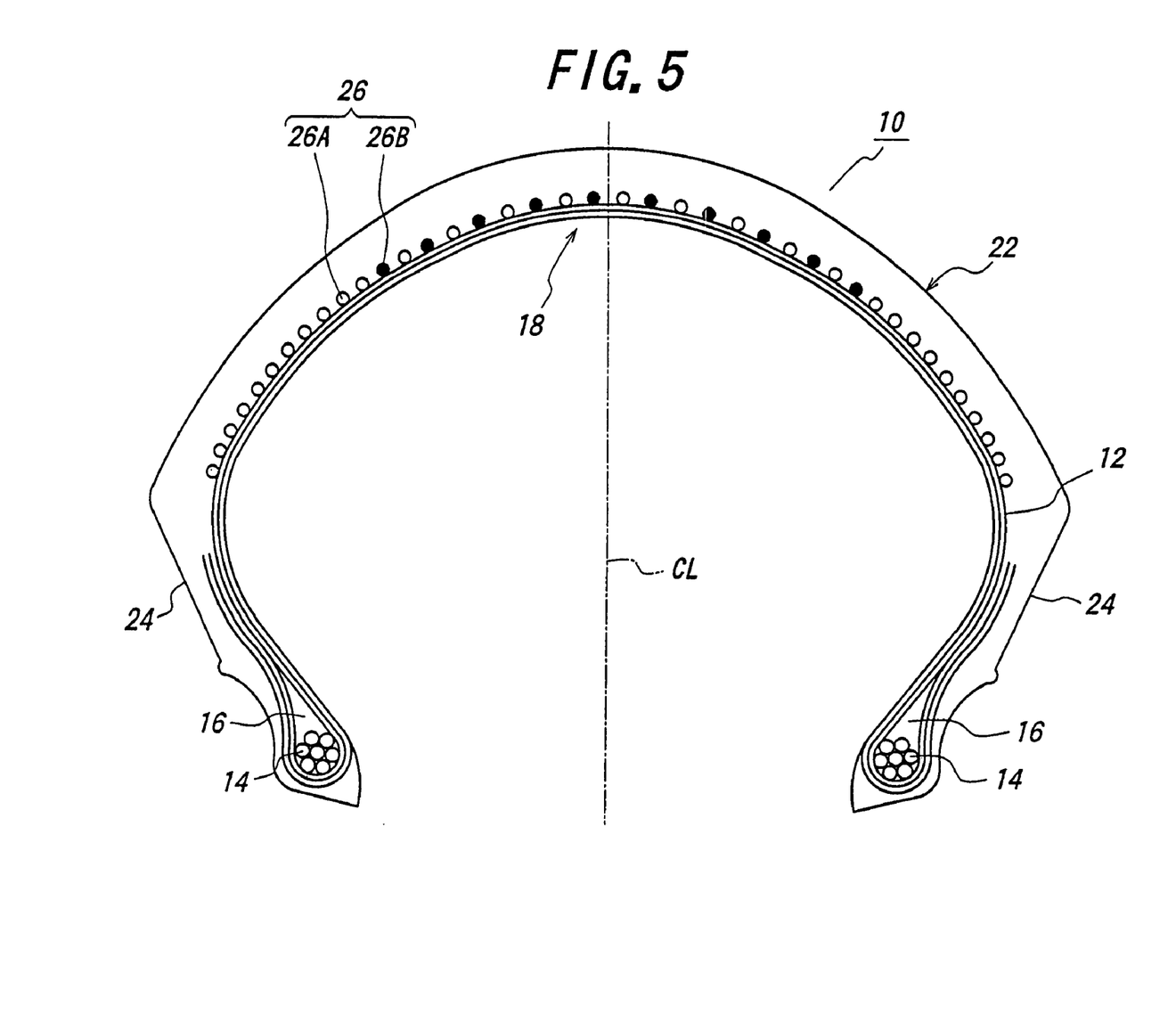
FIG. 5 is a diagrammatically section view of a fifth embodiment of the pneumatic tire according to the invention.

In FIG. 5 is shown a fifth embodiment of the pneumatic tire according to the invention, wherein one cord, for example, the fiber reinforcing cord 26B among the two different cords 26A, 26B is arranged on a central portion of the spiral belt 26 in the widthwise direction of the tire 10 instead of the arrangement of the two different cords shown in FIG. 1. In this case, the rigidity distribution of the tread 22 can be optionally adjusted likewise the above fourth embodiment.

The production method of an embodiment of the pneumatic tire according to the invention will be described below with reference to FIGS. 6 and 7.

Figure 6:
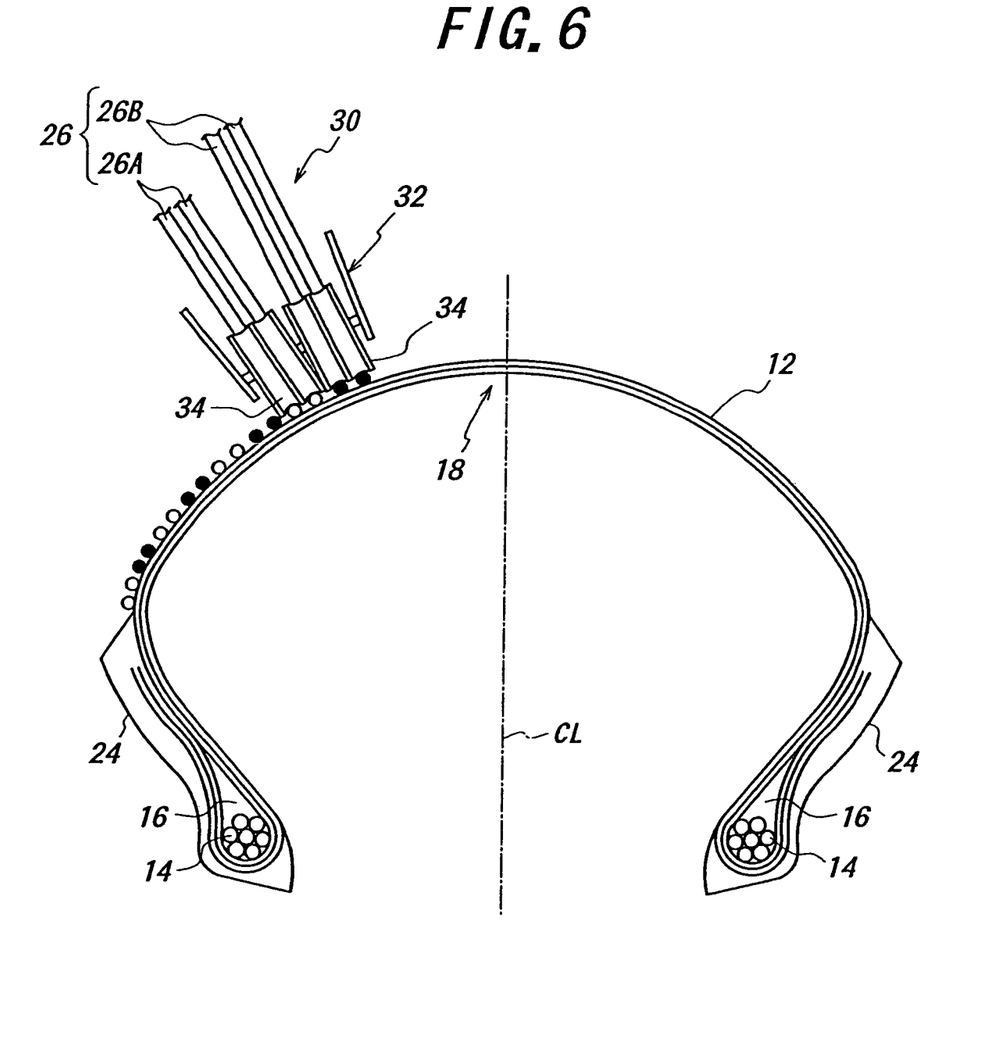
FIG. 6 is a diagrammatically section view illustrating a production method of the pneumatic tire according to the invention.

As shown in FIG. 6, a double-start type head 32 is arranged in a cord winding machine 30, wherein at least a pair of rollers, two pairs of rollers 34 in the illustrated embodiment are arranged in the head 32 so as to engage with two cords every the roller pair.

Figure 7:
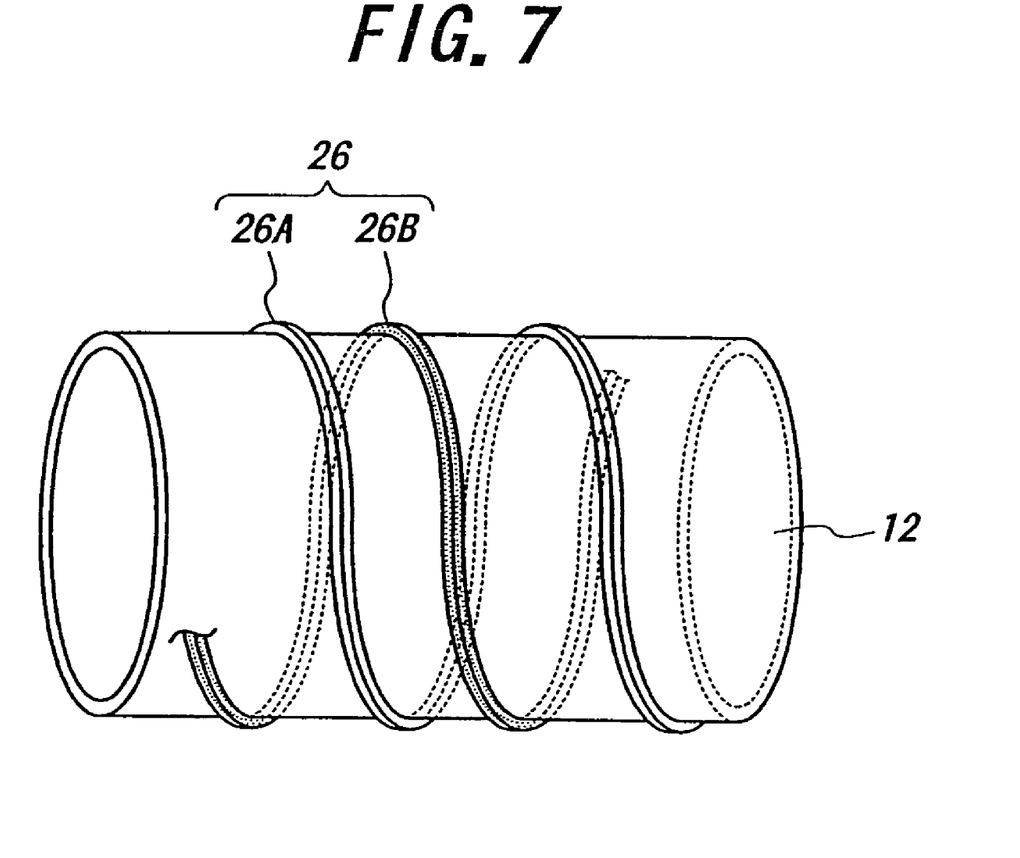
FIG. 7 is a perspective view illustrating a state of winding cords around a carcass in the production of the pneumatic tire according to the invention.

As shown in FIGS. 6 and 7, two steel cords 26A and two fiber reinforcing cords 26B are spirally wound on an outer peripheral face of the carcass 12 from one end of the tread 22 toward the other end thereof in the widthwise direction by means of such a cord winding machine 30 to form a spiral belt 26.

Thereafter, rubber members are disposed on the outer surfaces of the carcass 12 and the spiral belt 26 and then cured to form a pneumatic tire 10 comprising the spiral belt 26 embedded in the tread 22.

That is, according to the invention, the optimum number (1 to 5) of the two different cords, e.g. two steel cords 26A and two fiber reinforcing cords 26B in the illustrated embodiment can simultaneously be wound by adopting the cord winding machine 30 provided with the double-start type head 32 to form the desired spiral belt 26.

And also, the steel cord 26A and the fiber reinforcing cord 26B as the two different cords can simultaneously be wound from one end of the tread 22 toward the other end thereof in the widthwise direction at once so as to always sandwich from each other and alternately position at equal intervals by adopting the above cord winding machine 30.

As a result, the productivity of the tire 10 is improved. And also, the two different cords can equally be arranged, so that the rigidity of the tread 22 is made uniform to improve the tire performances such as durability, steering stability and the like.

The following examples are given in illustration of the invention and are not intended as limitations thereof.

There are provided radial tires of Examples 1 and 2 and Conventional Examples 1 and 2, respectively. The radial tire of Conventional Example 1 comprises a spiral belt constructed with only a fiber reinforcing cord of an aromatic polyamide, while the radial tire of Conventional Example 2 comprises a spiral belt constructed with only a steel cord.

On the contrary, the radial tire of Example 1 comprises a spiral belt constructed with a combination of two different cords consisting of a steel cord and a fiber reinforcing cord of an aromatic polyamide and having a structure shown in FIG. 1, while the radial tire of Example 2 comprises a spiral belt constructed with a combination of two different cords consisting of a steel cord and a fiber reinforcing cord of an aromatic polyamide and having a structure shown in FIG. 4.

Each of these tires is subjected to a running test by mounting onto a motorcycle as a rear tire in addition to a hydraulic burst pressure test to obtain results as shown in Table 1. In this case, a radial tire comprising cross belt layers of KEVLAR is used as a front tire and also the tire of Example 2 is not subjected to these tests.

TABLE 1

|  | Conventional Example 1 | Conventional Example 2 | Example 1 |
|---|---|---|---|
| Hydraulic burst pressure (KPa) | 250 | 150 | 250 |
| High-speed stability | 100 | 120 | 120 |
| Light feeling and responsibility | 100 | 120 | 120 |
| Gripping force in cornering | 100 | 110 | 120 |
| Ride comfort | 100 | 80 | 90 |

As seen from Table 1, when the tire of Example 1 is compared with the tire of Conventional Example 1, the hydraulic burst pressure is equal to and the ride comfort is somewhat low, but the other running performances are higher than those of the conventional tire. And also, the running performances in the tire of Example 1 are equal to or more than those of the tire of Conventional Example 2.

On the other hand, each of these tires is subjected to a running test by mounting onto a motorcycle as a front tire in addition to a hydraulic burst pressure test to obtain results as shown in Table 2. In this case, a radial tire comprising a circumferential belt of KEVLAR is used as a rear tire.

TABLE 2

|  | Conventional Example 1 | Conventional Example 2 | Example 1 | Example 2 |
|---|---|---|---|---|
| Hydraulic burst pressure (KPa) | 250 | 150 | 250 | 220 |
| High-speed stability | 100 | 110 | 120 | 115 |
| Resistance to shimmy | 100 | 110 | 105 | 120 |
| Light feeling | 100 | 120 | 120 | 115 |
| Gripping force in cornering | 100 | 110 | 120 | 120 |
| Ride comfort | 100 | 80 | 90 | 100 |

As seen from Table 2, when the tire of Example 1 is compared with the tire of Conventional Example 1, the hydraulic burst pressure is equal to and the ride comfort is somewhat low, but the other running performances are higher than those of the conventional tire. And also, the running performances in the tire of Example 1 are equal to or more than those of the tire of Conventional Example 2 though the resistance to shimmy is somewhat low.

On the other hand, when the tire of Example 2 is compared with the tire of Conventional Example 1, the hydraulic burst pressure is somewhat low within a range causing no problem, but the other performances are equal to or more than those of Conventional Example 1. And also, when Example 2 is compared with Conventional Example 2, the light feeling is somewhat low, but the other performances are equal to or more than those of Conventional Example 2.

In Tables 1 and 2, the performances other than the hydraulic burst pressure are represented by an index on the basis that Conventional Example 1 is 100, in which the larger the index value, the better the performance.

As seen from Tables 1 and 2, the steering stability and other performances are totally higher in the tires of Examples 1 and 2 than in the tires of Conventional Examples 1 and 2, so that it can be said that the invention tires are superior to the conventional tires.

In the running test, the front tire has a size of 120/70ZR17 and the rear tire has a size of 190/50ZR17, and a rim size for the front tire is MT3.50×17 and a rim size for the rear tire is MT6.00×17, and an air pressure for each of the front and rear tires is 250 kPa. And also, YAMAHA Model R1 is adopted as a test motorcycle.

Concrete data (typical values) of cords mentioned and used in the above embodiments and examples are as follows. Moreover, the invention is not restricted to these numerical values.

| Material | Twisting construction | Initial tension |
|---|---|---|
| Nylon-66 | 1400d/2 | 94.6 cN/cord |
| PET | 1670d/2 | 120 cN/cord |
| PEN | 1670d/2 | 331 cN/cord |
| Rayon | 1840d/2 | 221 cN/cord |
| Aromatic polyamide | 1670d/2 | 736 cN/cord |
| Steel | L1501 × 5 | 3300 cN/cord |

As mentioned above, according to the invention, the spiral belt is constructed with the combination of two different cords, so that the end count can be rendered into an appropriate value and the steering stability and other performances can be improved.

What is claimed is:

1. In a pneumatic tire comprising a spiral belt formed by spirally winding a cord(s) along a circumferential direction of a torus tread, wherein the spiral belt comprises at least one layer constructed with a combination of at least two different types of cords comprising a steel cord and a fiber reinforcing cord each having an initial tension of not less than 50 cN/cord, and wherein the at least two different cord types are arranged in an alternating, repeated fashion at both side portions of the spiral belt in the widthwise direction and only the steel cord is arranged in a central portion of the spiral belt in the widthwise direction.

* * * * *